US010249037B2

(12) United States Patent
Chang et al.

(10) Patent No.: US 10,249,037 B2
(45) Date of Patent: Apr. 2, 2019

(54) ECHOGENICITY QUANTIFICATION METHOD AND CALIBRATION METHOD FOR ULTRASONIC DEVICE USING ECHOGENICITY INDEX

(71) Applicant: AmCad BioMed Corporation, Taipei (TW)

(72) Inventors: King-Jen Chang, Taichung (TW); Chiung-Nein Chen, Taipei (TW); Ming-Hsun Wu, Taipei (TW); Argon Chen, Taipei (TW); Yu-Hsin Wang, Taipei (TW); Kuo-Chen Huang, Taipei (TW)

(73) Assignee: AMCAD BIOMED CORPORATION, Taipei (TW)

( * ) Notice: Subject to any disclaimer, the term of this patent is extended or adjusted under 35 U.S.C. 154(b) by 923 days.

(21) Appl. No.: 14/557,013

(22) Filed: Dec. 1, 2014

(65) Prior Publication Data

US 2015/0086094 A1    Mar. 26, 2015

Related U.S. Application Data

(63) Continuation-in-part of application No. 12/693,253, filed on Jan. 25, 2010, now Pat. No. 8,948,474.

(51) Int. Cl.
*G06T 7/00* (2017.01)
*G06T 7/41* (2017.01)

(52) U.S. Cl.
CPC .............. *G06T 7/0012* (2013.01); *G06T 7/41* (2017.01); *G06T 2207/10132* (2013.01); *G06T 2207/20104* (2013.01); *G06T 2207/30096* (2013.01)

(58) Field of Classification Search
CPC .......................................... G06T 7/0012–7/41
See application file for complete search history.

(56) References Cited

U.S. PATENT DOCUMENTS 5,224,175 A    6/1993  Gouge et al.
5,656,763 A    8/1997  Flax
(Continued)

FOREIGN PATENT DOCUMENTS

CN    102133109 A    7/2011

OTHER PUBLICATIONS

Yair Zimmer, Ron Tepper, Solange Akselrod, "An Automatic Approach for Morphological Analysis and Malignancy Evaluation of Ovarian Masses Using B-Scans", *Ultrasound in Medicine and Biology*, 2003, pp. 1561-1570, 29(11).

(Continued)

*Primary Examiner* — Robert A Sorey
(74) *Attorney, Agent, or Firm* — Muncy, Geissler, Olds & Lowe, P.C.

(57) ABSTRACT

An echogenicity quantification method and a calibration method for ultrasonic device using echogenicity index are disclosed. The method includes: receiving an ultrasound image which comprises a plurality of grayscale pixels; choosing a region of interest (ROI); calculating the values of the grayscale pixels in ROI to obtain average value and standard deviation; excluding pixels in ROI with the grayscale value smaller than the sum of the minimum value in the grayscale image and the product of a first scaling factor and the standard deviation, and larger than the sum of the average value and the product of a second scaling factor and the standard deviation; averaging the values of the remaining grayscale pixels in ROI to obtain an average value of interest; choosing a reference region; averaging the values of the remaining grayscale pixels in the reference region to obtain an average value of reference; and calculating the difference between the average value of interest and the average value of reference to obtain an echogenicity index.

16 Claims, 8 Drawing Sheets

(56) References Cited

U.S. PATENT DOCUMENTS

| | | |
|---|---|---|
| 6,078,680 A | 6/2000 | Yoshida et al. |
| 6,137,899 A | 10/2000 | Lee et al. |
| 6,173,083 B1 | 1/2001 | Avinash |
| 6,898,303 B2 | 5/2005 | Armato et al. |
| 7,684,596 B2 | 3/2010 | Watson et al. |
| 7,689,016 B2 | 3/2010 | Stoecker et al. |
| 7,822,255 B2 | 10/2010 | Schutz |
| 8,199,994 B2 * | 6/2012 | Amir ........................ A61B 8/08 378/4 |
| 8,705,811 B1 | 4/2014 | Brunner |
| 8,744,157 B2 | 6/2014 | Valadez |
| 2002/0006216 A1 | 1/2002 | Armato et al. |
| 2003/0223627 A1 | 12/2003 | Yoshida et al. |
| 2004/0013292 A1 | 1/2004 | Raunig |
| 2006/0253020 A1 * | 11/2006 | Ehman ............. G01R 33/56358 600/411 |
| 2006/0269111 A1 | 11/2006 | Stoecker et al. |
| 2007/0276245 A1 * | 11/2007 | Konofagou ............... G06T 7/12 600/443 |
| 2008/0118136 A1 | 5/2008 | Cai et al. |
| 2008/0317325 A1 | 12/2008 | Ortyn et al. |
| 2009/0275831 A1 * | 11/2009 | Hall ........................ A61B 90/36 600/437 |
| 2010/0111396 A1 | 5/2010 | Boucheron |
| 2010/0150413 A1 | 6/2010 | Futamura |
| 2010/0260396 A1 | 10/2010 | Brandt et al. |
| 2010/0284588 A1 | 11/2010 | Valadez |
| 2011/0026788 A1 | 2/2011 | Elter et al. |
| 2011/0096965 A1 | 4/2011 | Ni et al. |
| 2011/0317897 A1 * | 12/2011 | Narasimhamurthy .. G06T 7/215 382/131 |
| 2013/0023767 A1 * | 1/2013 | Mammone ........... A61B 8/0825 600/440 |
| 2013/0165915 A1 * | 6/2013 | Thiel ...................... A61B 90/57 606/33 |
| 2016/0220711 A1 * | 8/2016 | DeMore ................. C07K 16/18 |

OTHER PUBLICATIONS

Khaled Taouil, Nadra Bee Romdhane, "Antomatic Segmentation and classification of Skin Lesion Images, Distributed Frameworks for Multimedia Applications", *The 2nd International Confrence on May 2006*, pp. 1-12, Pulau.

Chen et al., "Computerized Detection and Quantification of Microcalcifications in Thyroid Nodules", *Ultrasound in Medicine & Biology*, vol. 37, Issue 6; Jun. 2011; pp. 870-878.

Search Report dated Jul. 10, 2015 issued in corresponding EP patent application No. 14195578.1 (7 pgs.).

* cited by examiner

ECHOGENICITY QUANTIFICATION METHOD AND CALIBRATION METHOD FOR ULTRASONIC DEVICE USING ECHOGENICITY INDEX

FIELD OF THE INVENTION

The invention relates to an echogenicity quantification method and calibration method using echogenicity index. In particular, the invention relates to an echogenicity quantification method and calibration method for grayscale ultrasonic device using echogenicity index.

BACKGROUND OF THE INVENTION

Ultrasonic imaging is a common diagnostic imaging of the current clinical medicine. The echogenicity of grayscale ultrasound image which reflects the internal structure or constituent information of the tissue is one of the important clinical diagnostic indices. However, different imaging parameter setting, screen display, ambient lighting, or subjective consideration influences the interpretation of the echogenicity of grayscale ultrasound image so as to result in some errors on the interpretation and the variance of computer analysis, and to increase difficulties of the subsequent statistical analysis and clinical interpretation.

If the same lesion is imaged with different ultrasonic devices, the captured ultrasound images of the same lesion may have different echogenicity. For example, it tends to acquire inconsistent grayscale ultrasound images of the thyroid nodule due to the difference of the ultrasonic device or the parameter setting. The parameter settings which affect the echogenicity directly may include gain, depth, time gain compensation, and so on.

Different ultrasonic device may lead to different echogenicity of the same lesion. In addition, different physician having different subjective consideration or different condition of visual fatigue may have different interpretation of echogenicity even though the ultrasound image is captured by the same ultrasonic device and imaging parameter, and is displayed with the same screen and display setting. In order to improve the accuracy of aid diagnosis of the grayscale ultrasound images and relieve the working loads of the physicians, it is needed to develop an objective quantification method for assessing echogenicity of the Region Of Interest (ROI).

As a result, the inventor focused on the above object and finally developed the useful invention after detailed design and evaluation based on the development and design experience the related field for years.

SUMMARY OF THE INVENTION

The present invention provides an echogenicity quantification method and calibration method using echogenicity index. The echogenicity quantification method is to derive an echogenicity index for displaying on the clinical image to achieve the goal of objective quantification. In addition, the echogenicity index may be used to calibrate the echogenicity of different ultrasonic devices if being applied on the image calibration of the ultrasonic devices so as to provide similar echogenicity in different ultrasonic devices.

In an embodiment of the invention, the present invention provides an echogenicity quantification method, comprising: receiving an ultrasound image by an ultrasonic imaging device, and the ultrasound image comprising a plurality of pixel points, each pixel point having a grayscale value; choosing a region of interest (ROI) in the ultrasound image; counting the grayscale values of the pixel points in the ROI to obtain an average value of the ROI and a standard deviation of the ROI; excluding pixel points in the ROI with the grayscale values smaller than the sum of the minimum value in the grayscale image and the product of a first scaling factor and the standard deviation of the ROI; excluding the pixel points in the ROI with the grayscale values larger than the sum of the average value of the ROI and the product of a second scaling factor and the standard deviation of the ROI; averaging the grayscale values of the remaining pixel points in the ROI to obtain an average value of interest; choosing a reference region nonoverlapped with the ROI in the ultrasound image; averaging the grayscale values of the remaining pixel points in the reference region to obtain an average value of reference; and calculating the difference between the average value of interest and the average value of reference to obtain an echogenicity index.

In one embodiment of the invention, the present invention further provides an echogenicity quantification system, comprising: an ultrasonic imaging device for receiving an ultrasound image, and the ultrasound image comprising a plurality of pixel points, each pixel point having a grayscale value; an analyzing unit of a ROI connected to the ultrasonic imaging device for choosing the ROI in the ultrasound image; counting the grayscale values of the pixel points in the ROI to obtain an average value of the ROI and a standard deviation of the ROI; excluding the pixel points in the ROI with the grayscale values smaller than the sum of the minimum value in the grayscale image and the product of a first scaling factor and the standard deviation of the ROI; excluding the pixel points in the ROI with the grayscale values larger than the sum of the average value of the ROI and the product of a second scaling factor and the standard deviation of the ROI; and averaging the grayscale values of the remaining pixel points in the ROI to obtain an average value of interest; an analyzing unit of a reference region connected to the ultrasonic imaging device for choosing a reference region nonoverlapped with the ROI in the ultrasound image; and averaging the grayscale values of the remaining pixel points in the reference region to obtain an average value of reference; and a computing unit connected to the analyzing unit of the ROI and the analyzing unit of the reference region for calculating the difference between the average value of interest and the average value of reference to obtain an echogenicity index.

With the implementation of the present invention, an echogenicity index for quantification echogenicity is acquired. The echogenicity index applied in the clinical diagnosis, especially the ultrasonic diagnosis for thyroid nodule, has proved to increase the accuracy of diagnosis due to its excellent specificity.

The detailed features and advantages of the present invention will be described in detail with reference to the preferred embodiment so as to enable persons skilled in the art to gain insight into the technical disclosure of the present invention, implement the present invention accordingly, and readily understand the objectives and advantages of the present invention by perusal of the contents disclosed in the specification, the claims, and the accompanying drawings.

DETAILED DESCRIPTION OF THE INVENTION

Figure 1:
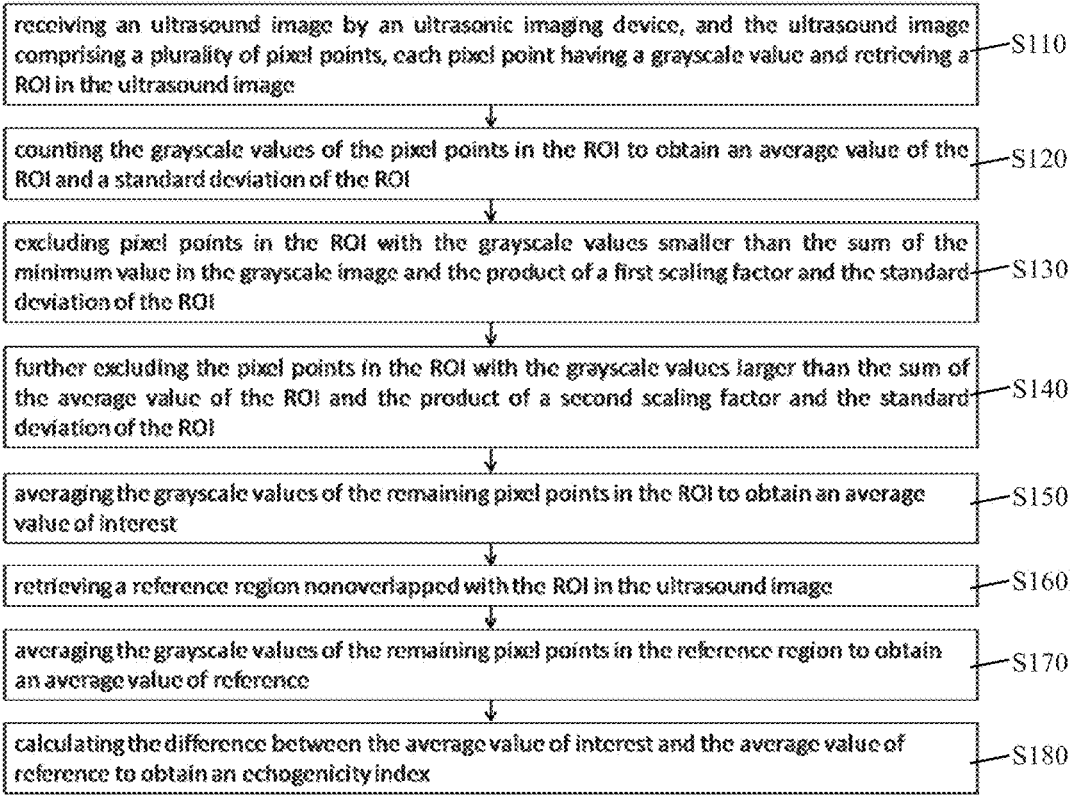
FIG. 1 is a diagram of the workflow of the echogenicity quantification method in one embodiment of the present invention.

As shown in FIG. 1, an embodiment of the present invention discloses an echogenicity quantification method S100 comprising: receiving an ultrasound image by an ultrasonic imaging device, and the ultrasound image comprising a plurality of pixel points, each pixel point having a grayscale value; choosing a ROI in the ultrasound image (step S110); counting the grayscale values of the pixel points in the ROI to obtain an average value of the ROI and a standard deviation of the ROI (step S120); excluding pixel points in the ROI with the grayscale values smaller than the sum of the minimum value in the grayscale image and the product of a first scaling factor and the standard deviation of the ROI (step S130); further excluding the pixel points in the ROI with the grayscale values larger than the sum of the average value of the ROI and the product of a second scaling factor and the standard deviation of the ROI (step S140); averaging the grayscale values of the remaining pixel points in the ROI to obtain an average value of interest (step S150); choosing a reference region nonoverlapped with the ROI in the ultrasound image (step S160); averaging the grayscale values of the remaining pixel points in the reference region to obtain an average value of reference (step S170); and calculating the difference between the average value of interest and the average value of reference to obtain an echogenicity index (step S180).

Figure 2:
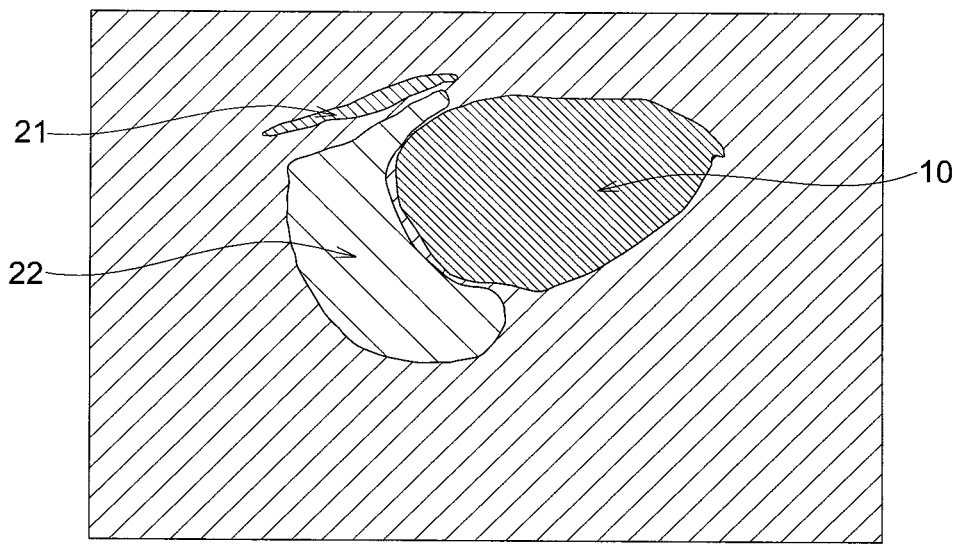
FIG. 2 is a schematic diagram of the retrieved ROI and reference region in one embodiment of the present invention.

As shown in FIG. 2, the method in the embodiment of the present invention may be applied on the ultrasonic device, or may be applied in the computer system which may be connected to the ultrasonic device. After the ultrasound image is captured by the ultrasonic device and the user selects the ROI 10 in the captured ultrasound image, the step S110 is performed. The processing unit or the computer system can directly receive the aforementioned ultrasound image, and the ultrasound image comprises a plurality of pixel points with grayscale values. The ROI 10 is retrieved in the ultrasound image. The ROI 10, such as the region of thyroid nodule, is usually the region where lesions are located or where users are interested.

In the step S120, the grayscale scale values of those pixel points in the ROI 10 are counted. The average of the above grayscale values is calculated to be an average value of the ROI (n1), and the standard deviation of the above grayscale values is calculated to be a standard deviation of the ROI (m1).

In a preferred embodiment, the counting may be performed on the gray/scale values of all the pixel points in the ROI 10.

In a preferred embodiment, in order to exclude a circular portion of low echogenicity (halo portion) outside the tumor or to eliminate the variation of the selected profile by different users, the profile of the ROI 10 may be constricted a specific circular range such as 5 to 10 pixels of width. After the above correction, the grayscale values of the rest of pixel points are counted to obtain the average value (n1) and the standard deviation (m1) of the ROI 10 with better quantitative evaluation.

Similarly, in a better embodiment, the pixel point in the ROI 10 may be excluded if its grayscale value is the outlier of the grayscale values or in a meaningless range, and then the grayscale values of the remaining pixel points are counted. It also helps to obtain a value with better quantitative evaluation. The outlier of the grayscale values and the meaningless range may be different due to various tissues.

The value in the meaningless range may be the grayscale value of anechoic region. Step S130 is performed to exclude the anechoic region in the ROI 10. The principle is to exclude the pixel points in the ROI 10 with the grayscale values smaller than the sum of the minimum value ($G_{min}$) in the grayscale image and a product of a first scaling factor (a) and the standard deviation (m1). In other words, the value in the meaningless range may be $G_{min}+a \times m1$.

The outlier of the grayscale value may be the grayscale value of the hyperechoic foci. The step S140 is performed to exclude the hyperechoic foci in the ROI 10. Principally, pixel points in the ROI 10 with the grayscale values larger than the sum of the average value of the ROI (n1) and the product of a second scaling factor (b) and the standard deviation of the ROI (m1) are excluded. That is to say, the outlier of the grayscale value may be $n1+(b \times m1)$, wherein the first scaling factor (a) may be a value within a range of 0 to 0.5, and the second scaling factor (b) may be a value within a range of 2 to 5.

In one preferred embodiment, the anechoic region may be excluded before the step S140. The grayscale values of the remaining pixel points in the ROI 10 are counted to obtain an average value and a standard deviation, and these results may be used to update the average value of the ROI (n1) and the standard deviation of the ROI (m1). Then, step S140 may be performed.

Afterwards, step S150 is performed. After excluding the above pixel points, the grayscale values of the remaining pixel points in the ROI 10 are averaged to obtain an average value of interest (μROI). Then, in the step S160, a reference region 20 nonoverlapped with the ROI 10 in the ultrasound image is retrieved.

In one better embodiment, the reference region 20 may be a region selected from the ultrasound image by a user. The user may select a normal tissue with large area outside the lesion (such as the thyroid tissue region 22), a muscle tissue close to the surface (such as region 21), or a superficial area in the image according to the tissue anatomy to be the reference region 20, so as to build the contrast region of the echogenicity in the same image.

Figure 3:
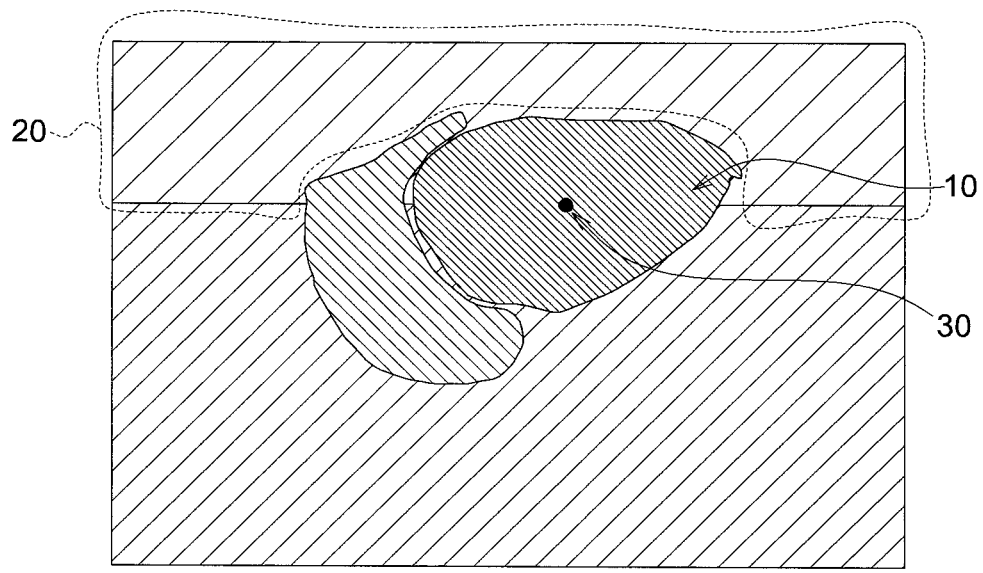
FIG. 3 is another schematic diagram of the retrieved reference region in one embodiment of the present invention.

Referring to FIG. 3, in one preferred embodiment, the reference region 20 may be selected manually or automatically. The reference region 20 may be situated in an image area which is upside of the centroid 30 of the ROI 10 and not in the ROI 10 as shown in the FIG. 3. In other words, the reference region 20 may be situated at the upside of the centroid 30 and outside of the ROI 10 in the ultrasound image. However, the definition of the scope is not limited hereto.

In the Step S170, the grayscale values of the remaining pixel points in the reference region 20 are averaged to obtain an average value of reference (μRef).

In one preferred embodiment, the average value of reference (μRef) may be calculated using all the pixel points in the reference region 20 if not excluding any reference pixel points.

In a better embodiment, the quantification method of the present invention may further comprises a step of excluding the pixel points with a grayscale value in the meaningless range before the calculation of the average value of reference (μRef). First of all, the grayscale values of the above pixel points in the reference regions 20 are counted to obtain an average value of the reference region (n2) and a standard deviation of the reference region (m2). Consequently, the pixel points in the reference region 20 with the grayscale values smaller than the sum of the minimum value ($G_{min}$) in the grayscale image and a product of a third scaling factor (c) and the standard deviation of the reference region (m2) are excluded. That is to say, the grayscale value in the meaningless range may be $G_{min}+c \times m2$.

In one further preferred embodiment, the quantification method of the present invention may further comprises a step of excluding the pixel points in the reference region 20 of which grayscale value is the outlier of all the grayscale values in the reference region 20 before the calculation of the average value of reference (μRef). Principally, pixel points in the reference region 20 with the grayscale values larger than the sum of the average value of the reference region (n2) and the product of a fourth scaling factor (d) and the standard deviation of the reference region (m2) are excluded. That is to say, the outlier of the grayscale value may be n2+(d×m2), wherein the third scaling factor (c) may be a value within a range of 0 to 0.5, and the fourth scaling factor (d) may be a value within a range of 0 to 5.

In one preferred embodiment, the average value and the standard deviation of the grayscale values of the remaining pixel points in the reference region 20 are counted after excluding the grayscale values within the meaningless range. The results may be used to update the average value of the reference region and the standard deviation of the reference region. Finally, the outlier of the grayscale value may be excluded.

Finally, the difference between the average value of interest and the average value of reference is calculated to obtain an echogenicity index (EI) in the step S180. That is, the echogenicity index is defined as μROI-μRef.

In one preferred embodiment, the echogenicity index may be further normalized with μRef. The echogenicity index may express the echogenicity level of the ROI (such as thyroid nodules) in the grayscale ultrasound image, and may be used as a basis of clinical diagnosis analysis to figure out what the tissue echogenicity means after the quantification of ultrasound image.

Figure 4:
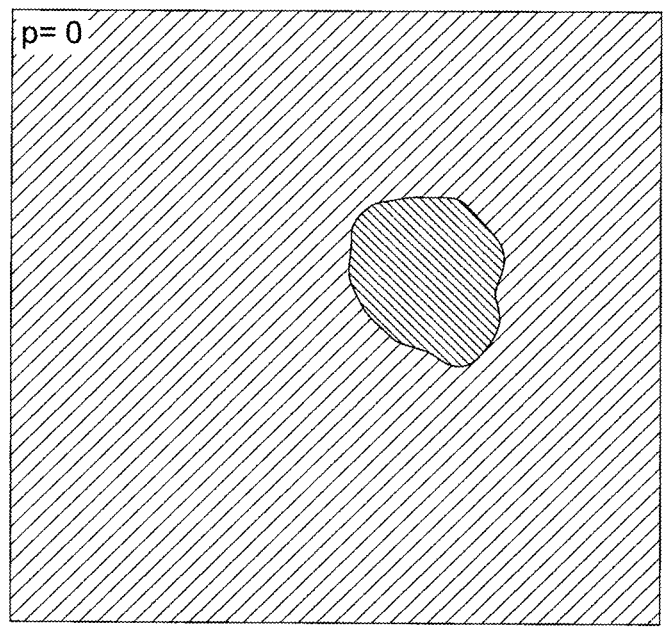
FIG. 4 is a diagram of the imaged echogenicity index in one embodiment of the present invention.

As shown in FIG. 4, in one preferred embodiment, the quantification method of the present invention may further comprise visualizing the echogenicity index by filling corresponding grayscale color in the ROI 10 and outside the ROI 10. The detailed steps is as following: setting the grayscale values of the an image area outside the ROI 10 to a background value related with visual sensitivity; setting the grayscale values of the pixel points within the ROI 10 to a value, wherein the value is the product of the background value and the average value of interest divided by the average value of reference; and plotting a contrast image of color level.

If the resulted grayscale value of the ROI is larger than the maximum value of the displayed color level, then the grayscale value is set to the maximum value. In contrast, if the resulted grayscale value of the ROI is smaller than the minimum value of the displayed color level, then the grayscale value is set to the minimum value.

Figure 5A:
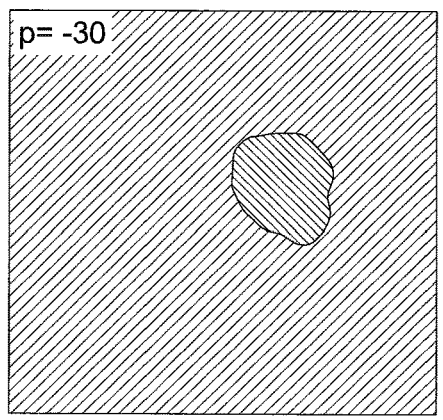
FIG. 5A to FIG. 5C show the diagrams of imaged contrast with different p value in one embodiment of the present invention.
Figure 5B:
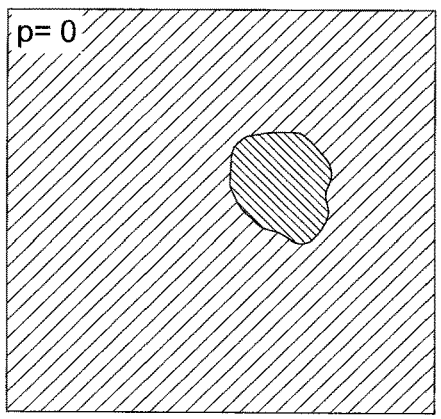
Figure 5C:
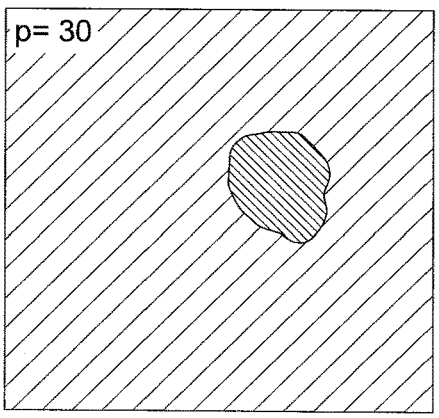

In one preferred embodiment, the quantification method of the present invention may further comprise that the grayscale values outside the ROI 10 are defined to equal to x+y×p with the modification of visual sensitivity (p) by the user, wherein x and y are constants which make the grayscale value between the minimum and the maximum of the displayed color level to be the visualization background for the image. As shown in FIG. 5A to 5C, users may adjust the visual contrast by adjusting p value. The x in the FIG. 5A to 5C is set as 41.31, y is set as 0.8. The larger the p value, the contrast is sharper after visualization. The invention is not limited hereto.

In order to ensure the accuracy of the ultrasound image, the echogenicity quantification method utilizes a transform function to correct the grayscale value of the ultrasound image. The method includes that a phantom with a plurality of echo intensity areas is imaged repeatedly by an ultrasonic imaging device to obtain a plurality of first phantom images. The first phantom images comprise a plurality of pixel points to be corrected, and each pixel point to be corrected has a grayscale value.

Consequently, the grayscale values of the pixel points to be corrected corresponding to one of the echo intensity areas in each first phantom image are counted to obtain an average to be corrected of the echo intensity area. Repeating the aforementioned step, a plurality of averages to be corrected are obtained corresponding to different echo intensity areas respectively.

Figure 6A:
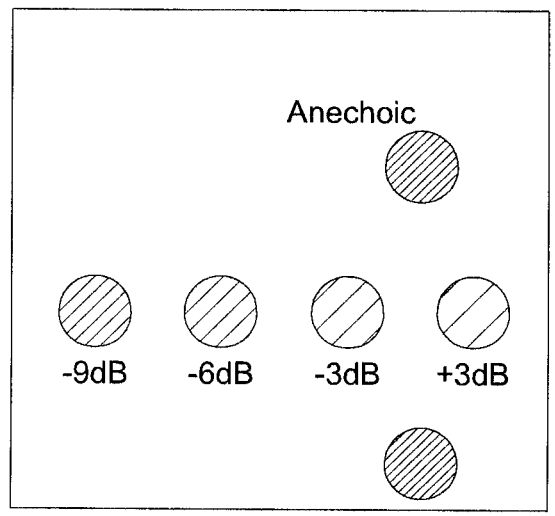
FIG. 6A to FIG. 6B show the schematic diagrams of phantom image comprising different echo features in one embodiment of the present invention.
Figure 6B:
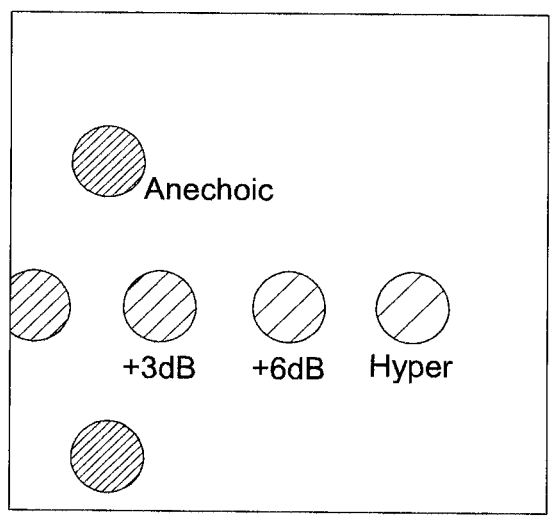

Referring to FIG. 6A and FIG. 6B, in one preferred embodiment, the ultrasonic imaging device (GE) and a baseline ultrasonic imaging device (Philips) scanned the phantom to acquire seven sets of images, including the set of −9 dB, −6 dB, −3 dB, 0 dB, 3 dB, 6 dB and Hyper. Every set of images has ten images. Then, the result of the averages to be corrected and the baseline averages is obtained as in Table 1:

TABLE 1

|  | −9 dB | −6 dB | −3 dB | 0 dB | +3 dB | +6 dB | Hyper |
| --- | --- | --- | --- | --- | --- | --- | --- |
| Philips | 15.86 | 23.18 | 40.38 | 53.82 | 69.10 | 81.25 | 101.82 |
| GE | 20.53 | 32.40 | 46.46 | 57.67 | 72.52 | 81.73 | 90.46 |

Finally, the plurality of baseline averages are obtained through a baseline ultrasonic imaging device. The average to be corrected and the baseline average of the same echo intensity area are compared, and a transform function of the averages to be corrected and the baseline averages of different echo intensity areas is derived with a trend line which is derived by adding a minimum grayscale range and a maximum grayscale range.

Figure 7:
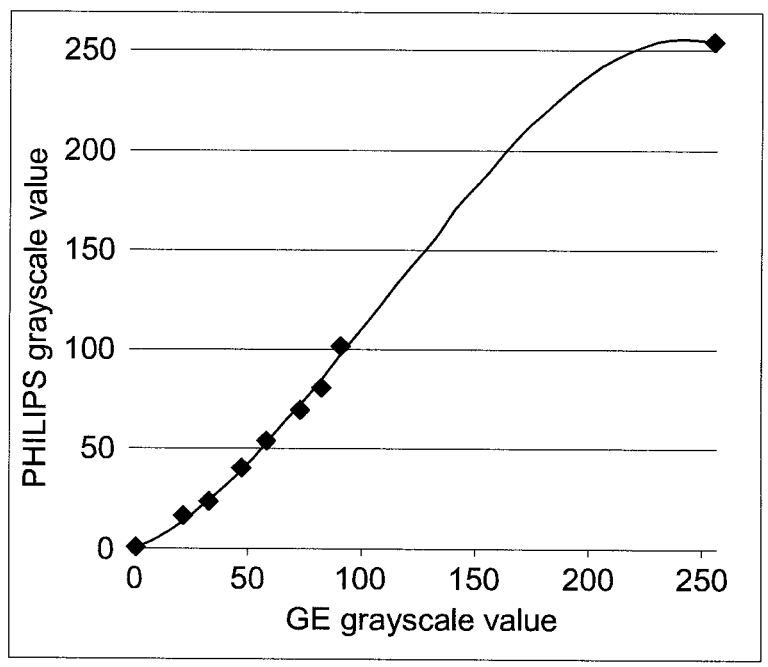
FIG. 7 shows a diagram of the compared ultrasonic imaging device (GE) and the baseline ultrasonic imaging device (Philips).

As shown in FIG. 7, in a preferred embodiment, two values (0 and 225) are put into the grayscale values of the compared ultrasonic imaging device (GE) and the baseline ultrasonic imaging device (Philips) in Table 1, and then the scatter plot is depicted. Furthermore, the transform function for transforming the image of the device to be corrected (GE) to the image of the reference device (Philips) is fitted by a function of cubic polynomial. As shown in FIG. 7, the fitted transform function of a function of cubic polynomial is $y=0.000027x^3+0.008988x^2+0.487314x$, $R^2=0.998890$. The clinical image of the ultrasonic imaging device (GE) may change its grayscale characteristic to resemble the baseline ultrasonic imaging device (Philips) through the transform function as so to acquire similar echogenicity. The present invention is not limited hereto.

In one preferred embodiment, the phantom with a plurality of echo intensity areas is imaged repeatedly by the baseline ultrasonic imaging device to obtain a plurality of second phantom images having a plurality of baseline pixel points, wherein each baseline pixel point has a grayscale value. The grayscale values of the baseline pixel points corresponding to one of the echo intensity areas in each second phantom image are counted to obtain the baseline average of the echo intensity area. The aforementioned step is repeated corresponding to different echo intensity areas to obtain all the baseline averages.

Figure 8:
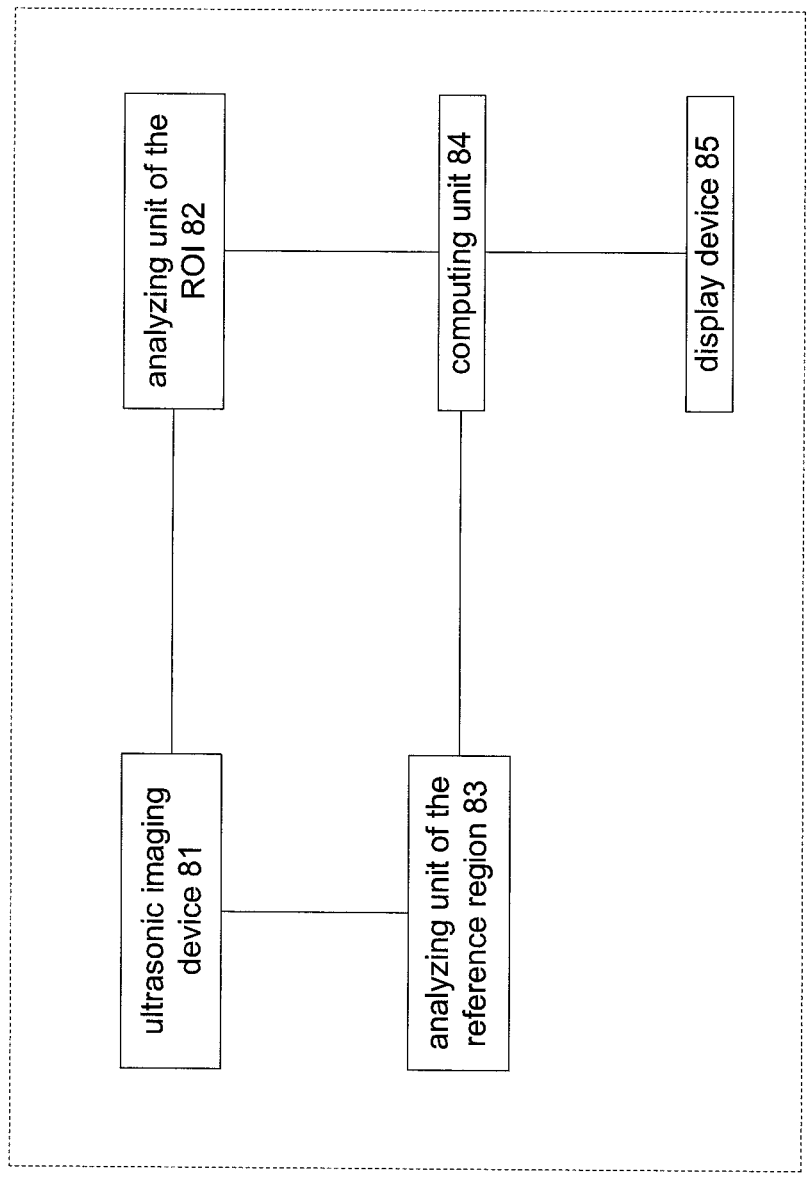
FIG. 8 shows a diagram of echogenicity quantification system in one embodiment of the present invention.

As shown in FIG. 8, the embodiment of present invention also discloses an echogenicity quantification system 8 comprising an ultrasonic imaging device 81, an analyzing unit of the ROI 82, an analyzing unit of the reference area 83, and a computing unit 84. The ultrasonic imaging device 81 receives an ultrasound image comprising a plurality of pixel points, and each pixel point has a grayscale value. The analyzing unit of the ROI 82 connected to the ultrasonic imaging device 81 retrieves the ROI 10 in the ultrasound image. The grayscale values of the pixel points in the ROI 10 are counted to obtain an average value of the ROI and a standard deviation of the ROI. Then, the analyzing unit of the ROI 82 excludes the pixel points in the ROI 10 with the grayscale values smaller than the sum of the minimum value in the grayscale image and the product of a first scaling factor and the standard deviation of the ROI, and excludes the pixel points in the ROI 10 with the grayscale values larger than the sum of the average value of the ROI and the product of a second scaling factor and the standard deviation of the ROI. Finally, the grayscale values of the remaining pixel points in the ROI 10 are averaged to obtain an average value of interest. The analyzing unit of a reference region 83 connected to the ultrasonic imaging device 81 retrieves a reference region 20 nonoverlapped with the ROI 10 in the ultrasound image, and averages the grayscale values of the remaining pixel points in the reference region 20 to obtain an average value of reference. A computing unit 84 connected to the analyzing unit of the ROI 82 and the analyzing unit of the reference region 83 calculates the difference between the average value of interest and the average value of reference to obtain an echogenicity index.

In a preferred embodiment, the echogenicity quantification system 8 further includes a display device 85 connected to the computing unit 84. The display device 85 sets the grayscale values of an image area outside the ROI 10 to a background value related with visual sensitivity; sets the grayscale values of the pixel points within the ROI 10 to a value, wherein the value is the product of the background value and the average of interest divided by the average of reference, and then plots a contrast image of color level.

The features of the present invention are disclosed above by the preferred embodiment to allow persons skilled in the art to gain insight into the contents of the present invention and implement the present invention accordingly. The preferred embodiment of the present invention should not be interpreted as restrictive of the scope of the present invention. Hence, all equivalent modifications or amendments made to the aforesaid embodiment should fall within the scope of the appended claims.

What is claimed is:

1. An echogenicity quantification method, comprising:
receiving an ultrasound image by an ultrasonic imaging device, and the ultrasound image comprises a plurality of pixel points, each pixel point has a grayscale value;
choosing a region of interest (ROI) In the ultrasound image;
averaging the grayscale values of the pixel points in the ROI to obtain an average value of the ROI and calculating the grayscale scale values of the pixel points in the ROI to obtain a standard deviation of the ROI;
excluding the pixel points with the grayscale values smaller than the sum of the minimum value in the grayscale image and the product of a first scaling factor of a first constant and the standard deviation of the ROI from the ROI; wherein the first scaling factor is predetermined;
excluding the pixel points with the grayscale values larger than the sum of the average value of the ROI and the product of a second scaling factor of a second constant and the standard deviation of the ROI from the ROI; wherein the second scaling factor is predetermined;
averaging the grayscale values of the remaining pixel points in the ROI to obtain an average value of interest;
choosing a reference region which is nonoverlapped with the ROI in the ultrasound image;
averaging the grayscale values of the remaining pixel points in the reference region to obtain an average value of reference;
calculating the difference between the average value of interest and the average value of reference to obtain an echogenicity index by a computing device;
setting the grayscale values of an image area outside the ROI to a background value which is related with visual sensitivity by a display device; and
setting the grayscale values of the pixel points within the ROI to a value, wherein the value is the product of the background value and the average value of interest divided by the average value of reference by the display device.

2. The quantification method of claim 1, wherein the first scaling factor is a value within a range of 0 to 0.5, and the second scaling factor is a value within a range of 2 to 5.

3. The quantification method of claim 2, further comprising:
excluding the pixel points with the grayscale values larger than the sum of the average value of the reference region and the product of a fourth scaling factor and the standard deviation of the reference region from the reference region.

4. The quantification method of claim 3 wherein the third scaling factor is a value within a range of 0 to 0.5, and the fourth scaling factor is a value within a range of 0 to 5.

5. The quantification method of claim 1, further comprising:
calculating the grayscale values of the pixel points in the reference region to obtain an average value of the reference region and a standard deviation of the reference region; and
excluding the pixel points with the grayscale values smaller than the sum of the minimum value the grayscale values in the grayscale image and a product of a third scaling factor and the standard deviation of the reference region from the reference region.

6. The quantification method of claim 1, wherein the reference region is situated in an image area which is upside of the centroid of the ROI and not in the ROI.

7. The quantification method of claim 1, further comprising:
calibrating the grayscale values in the ultrasound image by a transform function.

8. The echogenicity quantification system of claim 1, the ultrasonic imaging device further:
calibrating the grayscale values in the ultrasound image by a transform function.

9. A method for deriving the transform function of claim 7 or claim 8, comprising:
imaging a phantom with a plurality of echo intensity areas repeatedly by an ultrasonic imaging device to obtain a plurality of first phantom images having a plurality of pixel points to be corrected, wherein each pixel point to be corrected has a grayscale value;
calculating the grayscale values of the pixel points to be corrected corresponding to one of the echo intensity areas in each first phantom image to obtain an average to be corrected of the echo intensity area;
repeating the aforementioned step to obtain a plurality of averages to be corrected corresponding to different echo intensity areas; and
obtaining a plurality of baseline averages through a baseline ultrasonic imaging device, comparing the average to be corrected and the baseline average of the same echo intensity areas and deriving a transform function of the averages to be corrected and the baseline averages of different echo intensity areas by adding a minimum grayscale range and a maximum grayscale range to derive a trend line.

10. The method of claim 9, wherein the baseline averages are obtained by: imaging the phantom with a plurality of echo intensity areas repeatedly by the baseline ultrasonic imaging device to obtain a plurality of second phantom images having a plurality of baseline pixel points, wherein each baseline pixel point has a grayscale value; calculating the grayscale values of the baseline pixel points corresponding to one of the echo intensity areas in each second phantom image to obtain the baseline average of the echo intensity area; and repeating the aforementioned step corresponding to different echo intensity areas.

11. An echogenicity quantification system, comprising:
an ultrasonic imaging device for receiving an ultrasound image, and the ultrasound image comprises a plurality of pixel points, each pixel point has a grayscale value;
an analyzing device of a region of interest (ROI) connects to the ultrasonic imaging device for choosing a region of interest (ROI) in the ultrasound image; averaging the grayscale values of the pixel points in the ROI to obtain an average value of the ROI and calculating the grayscale scale values of the pixel points in the ROI to obtain a standard deviation of the ROI; excluding the pixel points with the grayscale values smaller than the sum of the minimum value in the grayscale image and the product of a first scaling factor of a first constant and the standard deviation of the ROI from the ROI; excluding the pixel points with the grayscale values larger than the sum of the average value of the ROI and the product of a second scaling factor of a second constant and the standard deviation of the ROI from the ROI; and averaging the grayscale values of the remaining pixel points in the ROI to obtain an average value of interest; wherein the first scaling factor and the second scaling factor are predetermined;
an analyzing device of a reference region connects to the ultrasonic imaging device for choosing a reference region which is nonoverlapped with the ROI in the ultrasound image; and averaging the grayscale values of the remaining pixel points in the reference region to obtain an average value of reference;
a computing device connects to the analyzing device of the ROI and the analyzing device of the reference region for calculating the difference between the average value of interest and the average value of reference to obtain an echogenicity index; and
a display device connects to the computing device for setting the grayscale values of the an image area outside the ROI to a background value which is related with visual sensitivity; setting the grayscale values of the pixel points within the ROI to a value, wherein the value is the product of the background value and the average value of interest divided by the average value of reference.

12. The echogenicity quantification system of claim 11, the analyzing device of the reference region further:
calculating the grayscale values of the pixel points in the reference region to obtain an average value of the reference region and a standard deviation of the reference region; and
excluding the pixel points with the grayscale values smaller than the sum of the minimum value of the grayscale values (Gmin) in the grayscale image and a product of a third scaling factor and the standard deviation of the reference region from the reference region.

13. The echogenicity quantification system of claim 12, the analyzing device of the reference region further:
excluding the pixel points with the grayscale values larger than the sum of the average value of the reference region and the product of a fourth scaling factor and the standard deviation of the reference region from the reference region.

14. The echogenicity quantification system of claim 13, wherein the third scaling factor is a value within a range of 0 to 0.5, and the fourth scaling factor is a value within a range of 0 to 5.

15. An echogenicity quantification system of claim 11, wherein the first scaling factor is a value within a range of 0 to 0.5, and the second scaling factor is a value within a range of 2 to 5.

16. The echogenicity quantification system of claim 11, wherein the reference region is situated in an image area which is upside of the centroid of the ROI and not in the ROI.

* * * * *